(12) United States Patent
Gorokhov et al.

(10) Patent No.: US 12,056,614 B2
(45) Date of Patent: Aug. 6, 2024

(54) DYNAMIC PRUNING OF NEURONS ON-THE-FLY TO ACCELERATE NEURAL NETWORK INFERENCES

(71) Applicant: Intel Corporation, Santa Clara, CA (US)

(72) Inventors: Dmitry Gorokhov, Nizhny Novgorod (RU); Alexander Kozlov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 734 days.

(21) Appl. No.: 16/958,080

(22) PCT Filed: Apr. 9, 2018

(86) PCT No.: PCT/IB2018/000513
§ 371 (c)(1),
(2) Date: Jun. 25, 2020

(87) PCT Pub. No.: WO2019/197855
PCT Pub. Date: Oct. 17, 2019

(65) Prior Publication Data
US 2021/0027166 A1 Jan. 28, 2021

(51) Int. Cl.
*G06N 3/082* (2023.01)
*G06F 18/2113* (2023.01)
(Continued)

(52) U.S. Cl.
CPC ......... *G06N 3/082* (2013.01); *G06F 18/2113* (2023.01); *G06N 3/063* (2013.01); *G06N 5/04* (2013.01)

(58) Field of Classification Search
CPC ..... G06N 3/082; G06N 3/063; G06F 18/2113
See application file for complete search history.

(56) References Cited

U.S. PATENT DOCUMENTS

| 4,773,024 A * | 9/1988 | Faggin | G06V 10/75 706/26 |
| 2002/0057606 A1 * | 5/2002 | Milev | G06N 3/063 365/200 |
| 2019/0122113 A1 * | 4/2019 | Chen | G06N 3/084 |

FOREIGN PATENT DOCUMENTS

WO 2016154440 A1 9/2016

OTHER PUBLICATIONS

International Search Report and Written Opinion for International Patent Application No. PCT/IB2018/000513, mailed Jan. 2, 2019, 19 pages.

(Continued)

*Primary Examiner* — Tsu-Chang Lee
(74) *Attorney, Agent, or Firm* — Akona IP PC (57) ABSTRACT

Systems, apparatuses and methods may provide for technology that aggregates contextual information from a first network layer in a neural network having a second network layer coupled to an output of the first network layer, wherein the context information is to be aggregated in real-time and after a training of the neural network, and wherein the context information is to include channel values. Additionally, the technology may conduct an importance classification of the aggregated context information and selectively exclude one or more channels in the first network layer from consideration by the second network layer based on the importance classification.

24 Claims, 5 Drawing Sheets

(51) Int. Cl.
*G06N 3/063* (2023.01)
*G06N 5/04* (2023.01)

(56) References Cited

OTHER PUBLICATIONS

Lin et al., "Runtime Neural Pruning", 31st Conference on Neural Information Processing Systems, 2017, 11 pages, Long Beach CA.
Wu et al., "BlockDrop: Dynamic Inference Paths in Residual Networks", In Proceedings of the IEEE Conference on Computer Vision and Pattern Recognition (CVPR), Nov. 22, 2017, 11 pages.
Movidius, "Myriad 2 MA2x5x Vision Processor: Transforming Devices Through Ultra Low-Power Machine Vision", 2016, 2 pages.
"Intel MKL-DNN: A Performance Library for Deep Learning", intel.github.io/mkl-dnn/, Feb. 13, 2018, 4 pages.
"CS231n Convolutional Neural Networks fr Visual Recognition", cs231n.github.io/convolutional-networks/#fc, Feb. 13, 2018, 23 pages.
Geoffrey Hinton et al., "Distilling the Knowledge in a Neural Network", NIPS Deep Learning and Representation Learning Workshop, Mar. 9, 2015, 9 pages.
Song Han et al. "Deep Compression: Compressing Deep Neural Networks with Pruning, Trained Quantization and Huffman Coding", ICLR, Feb. 15, 2016, 14 pages.
Suraj Srinivas et al., "Data-free Parameter Pruning for Deep Neural Networks", BMVC, Jul. 22, 2015, 12 pages.
Ruichi Yu et al., "NISP: Pruning Networks using Neuron Importance Score Propagation", Nov. 17, 2017, 10 pages.
Yiwen Guo et al., "Dynamic Network Surgery for Efficient DNNs", 30th International Conference on Neural Information Processing Systems, Nov. 10, 2016, 9 pages.
Wei Liu et al. "SSD: Single Shot MultiBox Detector", Computer Vision—European Conference on Computer Vision 2016, Dec. 29, 2016, 17 pages.

* cited by examiner

DYNAMIC PRUNING OF NEURONS ON-THE-FLY TO ACCELERATE NEURAL NETWORK INFERENCES

CROSS REFERENCE TO RELATED APPLICATIONS

This application is a U.S. National Phase Patent Application which claims benefit to International Patent Application No. PCT/IB2018/000513 filed on Apr. 9, 2018.

TECHNICAL FIELD

Embodiments generally relate to neural networks. More particularly, embodiments relate to the dynamic pruning of neurons on-the-fly to accelerate neural network inferences.

BACKGROUND

Convolutional neural networks (CNNs) may be used in computer vision applications to support various tasks (e.g., object detection). The relatively large number of parameters and high computational cost of such networks, however, may render them difficult to use in power-constrained "edge" devices such as smart cameras.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Conventional attempts to reduce the number parameters and/or complexity of CNNs may identify redundancies in the network during training and statically remove the redundancies to obtain a final network configuration. Such an approach may result in lower accuracy depending on the image context encountered after deployment of the network.

Figure 1:
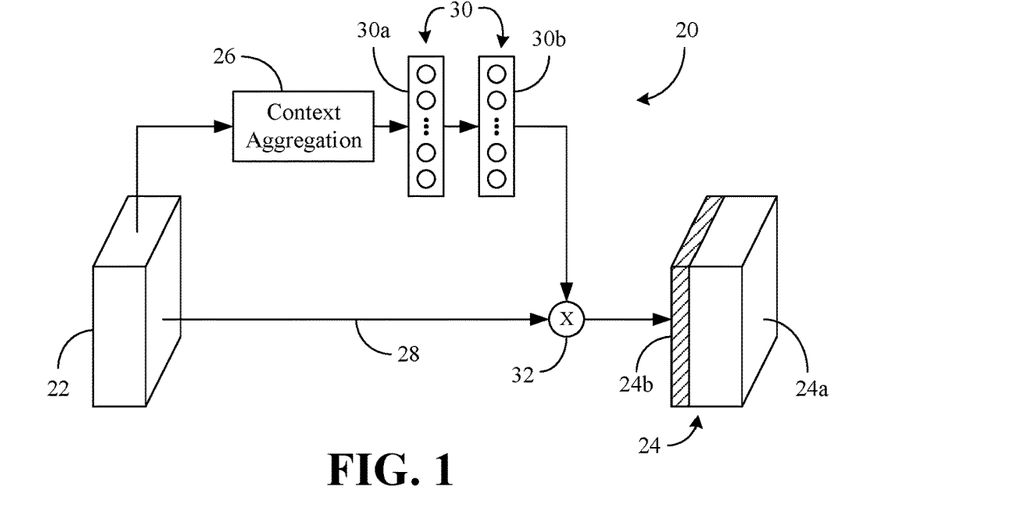
FIG. 1 is block diagram of an example of a branch path between layers in a neural network according to an embodiment.

Turning now to FIG. 1, a portion of a neural network is shown in which a second network layer 24 (24a, 24b, e.g., convolutional, rectified linear unit/ReLU, pooling, fully connected (FC) layer, etc.) is coupled to an output of a first network layer 22 (e.g., convolutional, ReLU, pooling FC layer, etc.). In one example, the input to the first network layer 22 holds raw pixel values of an image, where the first network layer 22 is a convolutional layer that extracts features (e.g., edges, curves, colors) from the image. The result may be an activation map 28 that indicates which regions of the image are likely to contain the features that the first network layer 22 is configured to extract. Configuring the first network layer 22 to extract certain features may be done during a training procedure in which known input images are fed to the neural network and filter weights of the first network layer 22 are adjusted to achieve a targeted result. Because the convolution process may involve a relatively high number of multiplication operations (e.g., dot product calculations between image pixel values and filter weights), the first network layer 22 may represent a correspondingly large portion of the computational cost/expense of the neural network. Similarly, the second network layer 24 might have a high computational cost.

For example, the computational complexity of a convolution layer may be determined by:

Num_of_input_channels×kernel_width×kernel_height× Num_of_output_channels

Although the ability to change the kernel size of the convolution operation may be limited, Num_of_input_channels and/or Num_of_output_channels may be manipulated to decrease computations during inferences.

As will be discussed in greater detail, a lightweight branch path 20 located (e.g., positioned and/or connected) between the first network layer 22 and the second network layer 24 may be used to prune unimportant channels (e.g., red channel, green channel, blue channel) from the activation map 28. More particularly, the branch path 20 may include a context aggregation component 26 that aggregates context information from the first network layer 22. In one example, the context information includes channel values (e.g., red channel values, green channel values, blue channel values) associated with the first network layer 22. Moreover, the context aggregation component 26 may be a downsample (e.g., pooling) layer that averages channel values in the first network layer 22. Additionally, the illustrated branch path 20 includes a plurality of FC layers 30 (30a, 30b) that conduct an importance classification of the aggregated context information and selectively exclude one or more channels in the first network layer 22 from consideration by the second network layer 24 based on the importance classification. The FC layers may generally function as memory that documents/memorizes various input data that is fed to the network during training. In the illustrated example, an unimportant channel portion 24b of the second network layer 24 is excluded from consideration and an important channel portion 24a is not excluded from consideration. As a result, the smaller second network layer 24 may facilitate faster inferences without incurring a loss of accuracy.

Thus, if the first network layer 22 has 256 output neurons, the context aggregation component 26 might provide a "blob" of 256 values to a first FC layer 30a, where the first FC layer 30a generates a high-level feature vector having 32 elements/output neurons (e.g., with the value of each output neuron indicating the likelihood of that neuron being activated). Additionally, a second FC layer 30b may generate an importance score vector based on the high-level feature vector, where the importance score vector has 256 output neurons. The second FC layer 30b may generally make higher level classifications than the first FC layer 30a. The importance score vector may contain zero values for neurons in less important channels. Accordingly, passing the activation map 28 and the importance score vector through a multiplier 32 may selectively exclude all neurons in the less important channels. The FC layers 30 may be considered "fully connected" to the extent that every neuron in the previous layer is connected to every layer in the next layer.

Of particular note is that the context information may be aggregated in real-time (e.g., on-the-fly) and after the training of the neural network. Accordingly, accuracy may be increased while accelerating inferences, regardless of the image context encountered after deployment of the neural network. For example, if the neural network is deployed in an application that processes images lacking features that were present in the images used in training, the illustrated pruning approach is able to reduce processing time by eliminating the channels configured to extract the missing features. Moreover, the technology described herein may facilitate the discard of some insignificant features that may otherwise prevent the network from making an accurate decision. Accordingly, the branch path 20 may be considered a regularization technique. As will be discussed in greater detail, the post-training pruning may use either a fixed pruning ratio constraint or an "adversarial" balance between a layer width loss and an accuracy constraint.

Figure 2:
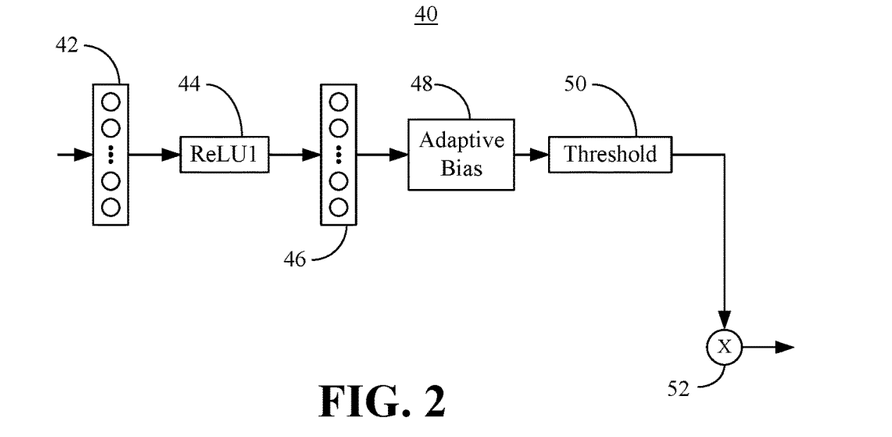
FIG. 2 is a block diagram of an example of a branch path that excludes channels from consideration based on a pruning ratio constraint according to an embodiment.

FIG. 2 shows branch path 40 that uses a fixed pruning ratio constraint to accelerate neural network inferences. The fixed pruning ratio constraint may generally be a percentage of channels to be pruned. In the illustrated example, a first FC layer 42 is coupled to an ReLU 44 ("ReLU") that introduces nonlinearity (e.g., clipping activation by a threshold of one) into the output (e.g., probability vector having 32 output neurons) of the first FC layer 42. A second FC layer 46 may be coupled to the ReLU 44, where the output (e.g., probability vector having 256 output neurons) of the second FC layer 46 may be processed by an adaptive bias component 48 (e.g., layer). The adaptive bias component 48 may calculate a bias that controls the ratio between positive and negative values in the probability vector from the second FC layer 46, where the ratio may be set based on a fixed pruning ratio constraint (e.g., 80% important, 20% unimportant). Additionally, a threshold layer 50 may set (e.g., truncate) all negative values in the output of the adaptive bias component 48 to zero and set all positive values in the output of the adaptive bias component 48 to one. Thus, passing an activation map (not shown) and the output of the threshold layer 50 through a multiplier 52 may selectively exclude all neurons in the less important channels, with importance being enforced via the pruning ratio constraint.

Figure 3:
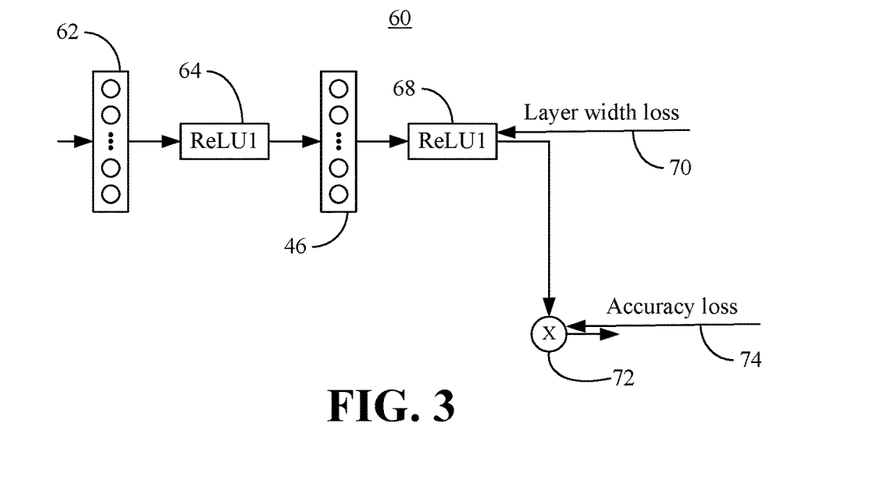
FIG. 3 is a block diagram of an example of a branch path that balances an accuracy constraint against a layer width loss according to an embodiment.

FIG. 3 shows a branch path 60 that uses an adversarial balance between a layer width loss 70 of the first network layer and an accuracy loss 74 (e.g., accuracy constraint) of the first network layer. In the illustrated example, a first FC layer 62 is coupled to an ReLU 64 that introduces nonlinearity (e.g., clipping activation by a threshold of one) into the output (e.g., probability vector having 32 output neurons) of the first FC layer 62. A second FC layer 66 may be coupled to the ReLU 64, where the output (e.g., probability vector having 256 output neurons) of the second FC layer 66 may be processed by another instance of the ReLU 68. The ReLU 68 may set some values in the output vector to zero. Accordingly, a multiplier 72 may selectively exclude all neurons in the less important channels, with importance being enforced via a pruning ratio constraint.

During the training of the neural network, the layer width loss 70 may be provided to the ReLU 68, while the accuracy loss 74 (e.g., accuracy constraint) is provided to the multiplier 72. The layer width loss 70 may be determined based on the pruning ratio constraint. In one example, the layer width loss is determined by calculating the mean across all elements (e.g., output neurons) of the vector of multipliers and then computing the Euclidean norm (e.g., distance) between the mean and the pruning ratio constraint. Accordingly, the calculated loss may be considered to be a penalty for layer width. During the training of the neural network, the accuracy loss 74 may be balanced against the layer width loss 70. In one example, balancing determines the optimal tradeoff between channel reduction and accuracy. More particularly, during the training process, there may be an adversarial situation where compliance with the constraint imposed by the accuracy loss 74 minimizes the error of the network, but the layer width loss 70 minimizes the number of channels and results in a penalty if the number of channels does not comply with the pruning ratio constraint.

Figure 4:
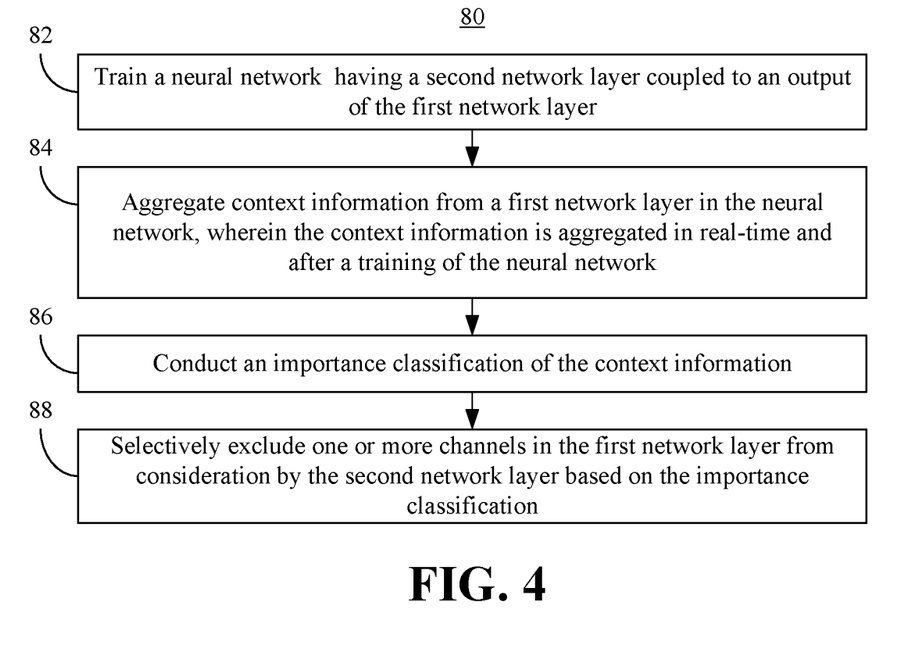
FIG. 4 is a flowchart of an example of a method of conducting pruning operations in a semiconductor apparatus according to an embodiment.

FIG. 4 shows a method 80 of conducting pruning operations. The method 80 may generally be implemented in a neural network containing one or more branch paths such as, for example, the branch path 20 (FIG. 1), the branch path 40 (FIG. 2) and/or the branch path 60 (FIG. 3). More particularly, the method 80 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 80 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 82 provides for training a neural network having a second network layer coupled to an output of a first network layer. In an adversarial balancing architecture, block 82 may include determining a layer width loss of the first network layer based on a pruning ratio constraint and balancing, during the training of the neural network, an accuracy constraint of the first network layer against the layer width loss. Block 82 may also provide for pruning the neural network during the training of the neural network. The training stage pruning may include static techniques such as, for example, randomly removing neurons or groups of neurons from the network. The static techniques may also involve considering an absolute magnitude of weights and activations (e.g., importance of neurons) and removing the least of them in each network layer. In yet another example, the static techniques may consider an error of the network during the training time and attempt to learn parameters that represent the probability that a particular neuron or group of neurons may be dropped. The result of the training may be a final network configuration that may be pruned again dynamically after deployment as described herein.

Context information may be aggregated at block 84 from a first network layer in the neural network, where the context information is aggregated in real-time and after a training of the neural network. Thus, the context information may correspond to post deployment input data (e.g., inference images). In one example, block 84 includes averaging, by a downsample (e.g., pooling) layer in a branch path located between the first network layer and the second network layer, channel values in the first network layer. Other approaches may be used to aggregate the context information. Block 86 may conduct an importance classification of the context information, where one or more channels in the first network layer may be excluded from consideration by the second network layer at block 88 based on the importance classification. Block 88 may include selecting the one or more channels based on a pruning ratio constraint (e.g., percentage of channels to be pruned).

Figure 5:
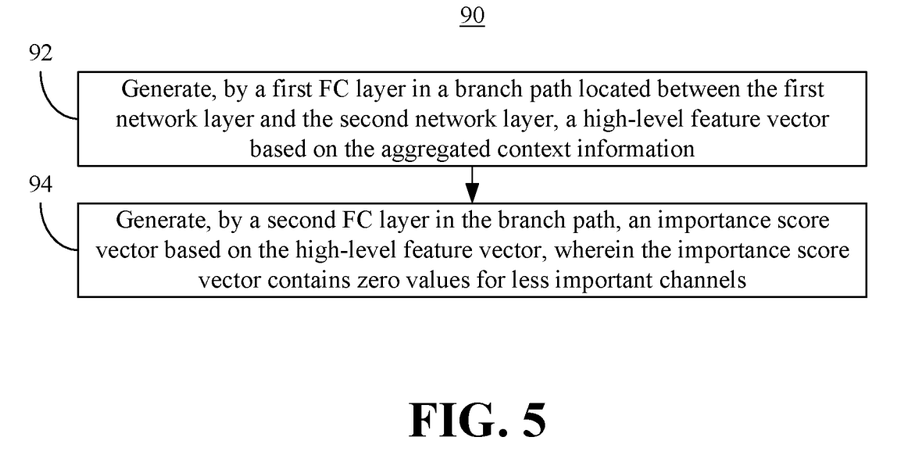
FIG. 5 is a flowchart of an example of a method of conducting an importance classification of context information according to an embodiment.

FIG. 5 shows a method 90 of conducting importance classifications of aggregated context information. The method 90 may readily substituted for block 86 (FIG. 4), already discussed. More particularly, the method 90 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 92 provides for generating, by a first FC layer in a branch path located between the first network layer and the second network layer, a high-level feature vector associated with the first network layer based on the aggregated context information. Additionally, block 94 may generate, by a second FC layer in the branch path, an importance score vector based on the high-level feature vector, where the importance score vector contains zero values for less important channels. In such a case, block 88 (FIG. 4) may include multiplying the output of the first network layer by the importance score vector.

Figure 6:
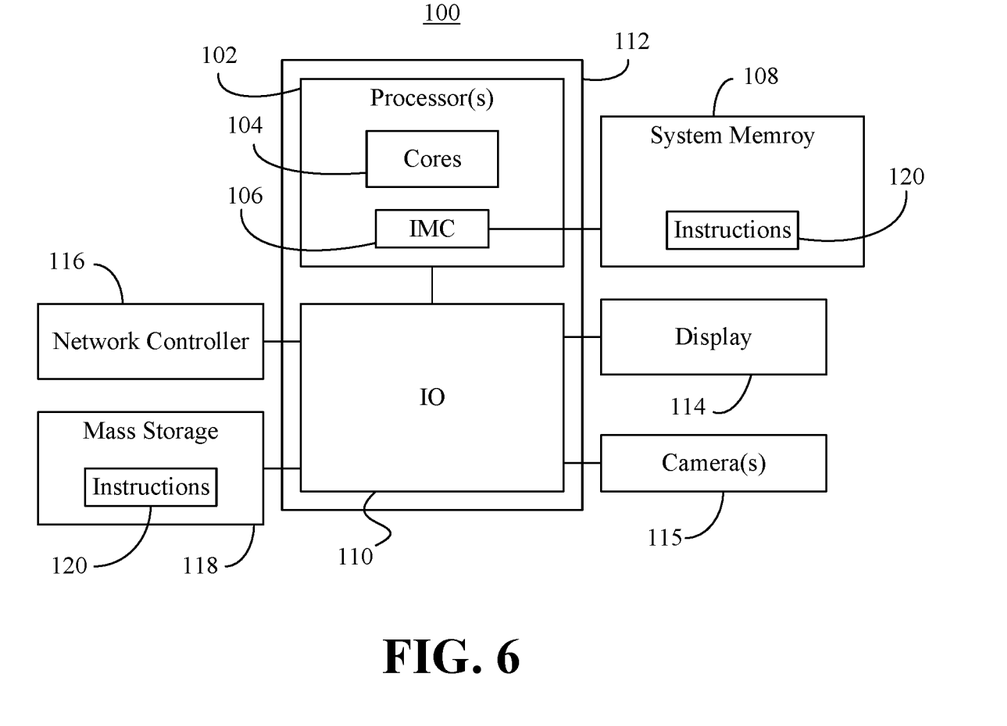
FIG. 6 is a block diagram of an example of a computer vision system according to an embodiment.

Turning now to FIG. 6, a computer vision system 100 (e.g., computing system) is shown. The system 100 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), etc., or any combination thereof. In the illustrated example, the system 100 includes one or more processors 102 (e.g., host processor(s), central processing unit(s)/CPU(s), vision processing units/VPU(s)) having one or more cores 104 and an integrated memory controller (IMC) 106 that is coupled to a system memory 108.

The illustrated system 100 also includes an input output (IO) module 110 implemented together with the processor(s) 102 on a semiconductor die 112 as a system on chip (SoC), where the IO module 110 functions as a host device and may communicate with, for example, a display 114 (e.g., touch screen, liquid crystal display/LCD, light emitting diode/LED display), a network controller 116 (e.g., wired and/or wireless), one or more cameras 115, and mass storage 118 (e.g., hard disk drive/HDD, optical disk, solid state drive/SSD, flash memory). The processor(s) 102 may execute instructions 120 (e.g., a specialized kernel inside a Math Kernel Library for Deep Learning Networks/MKL-DNN) retrieved from the system memory 108 and/or the mass storage 118 to perform one or more aspects of the method 80 (FIG. 4) and/or the method 90 (FIG. 5), already discussed.

Thus, execution of the instructions 120 may cause the system 100 to aggregate context information from a first network layer in a neural network having a second network layer coupled to an output of the first network layer, where the context information is aggregated in real-time and after a training of the neural network. The context information may be associated with image data (e.g., still images, video frames) captured by the camera(s) 115. Additionally, execution of the instructions 120 may cause the system 100 to conduct an importance classification of the aggregated context information and selectively exclude one or more channels in the first network layer from consideration by the second network layer based on the importance classification.

Figure 7:
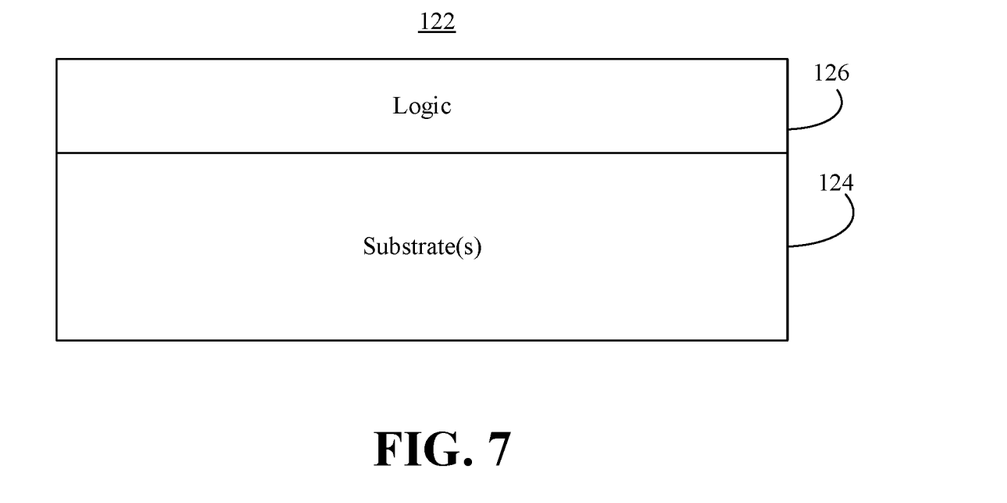
FIG. 7 is an illustration of an example of a semiconductor package apparatus according to an embodiment.

FIG. 7 shows a semiconductor apparatus 122 (e.g., chip, die, package). The illustrated apparatus 122 includes one or more substrates 124 (e.g., silicon, sapphire, gallium arsenide) and logic 126 (e.g., transistor array and other integrated circuit/IC components) coupled to the substrate(s) 124. The logic 126 may implement one or more aspects of the method 80 (FIG. 4) and/or the method 90 (FIG. 5), already discussed. Thus, the logic 126 may aggregate context information from a first network layer in a neural network having a second network layer coupled to an output of the first network layer, where the context information is aggregated in real-time and after a training of the neural network. The logic 126 may also conduct an importance classification of the aggregated context information and selectively exclude one or more channels from consideration by the second network layer based on the importance classification. The logic 126 may be implemented at least partly in configurable logic or fixed-functionality hardware logic. The logic 126 may also include the neural network. In one example, the logic 126 includes transistor channel regions that are positioned (e.g., embedded) within the substrate(s) 124. Thus, the interface between the logic 126 and the substrate(s) 124 may not be an abrupt junction. The logic 126 may also be considered to include an epitaxial layer that is grown on an initial wafer of the substrate(s) 124.

Figure 8:
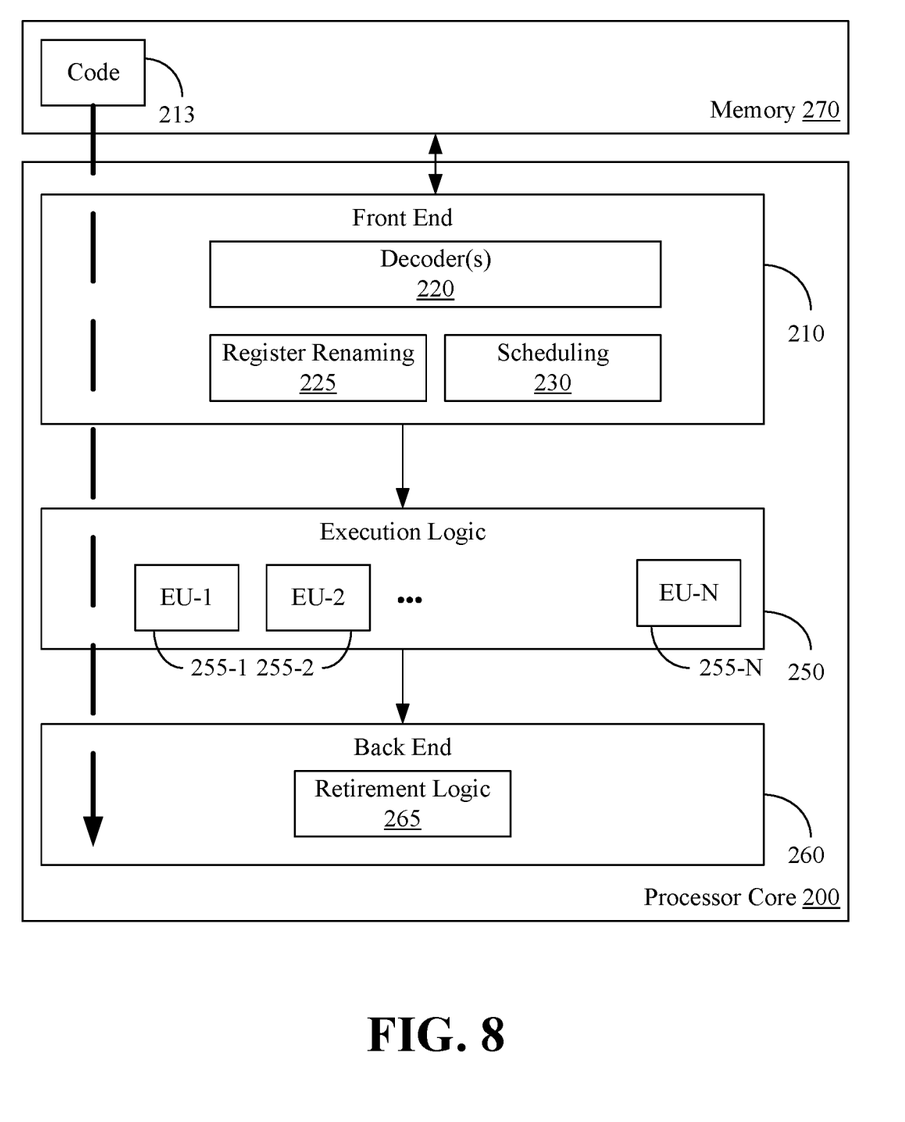
FIG. 8 is a block diagram of an example of a processor according to an embodiment.

FIG. 8 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 8, a processing element may alternatively include more than one of the processor core 200 illustrated in FIG. 8. The processor core 200 may be a single-threaded core or, for at least one embodiment, the processor core 200 may be multithreaded in that it may include more than one hardware thread context (or "logical processor") per core.

FIG. 8 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, where the code 213 may implement the method 80 (FIG. 4) and/or the method 90 (FIG. 5), already discussed.

The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 8, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 9:
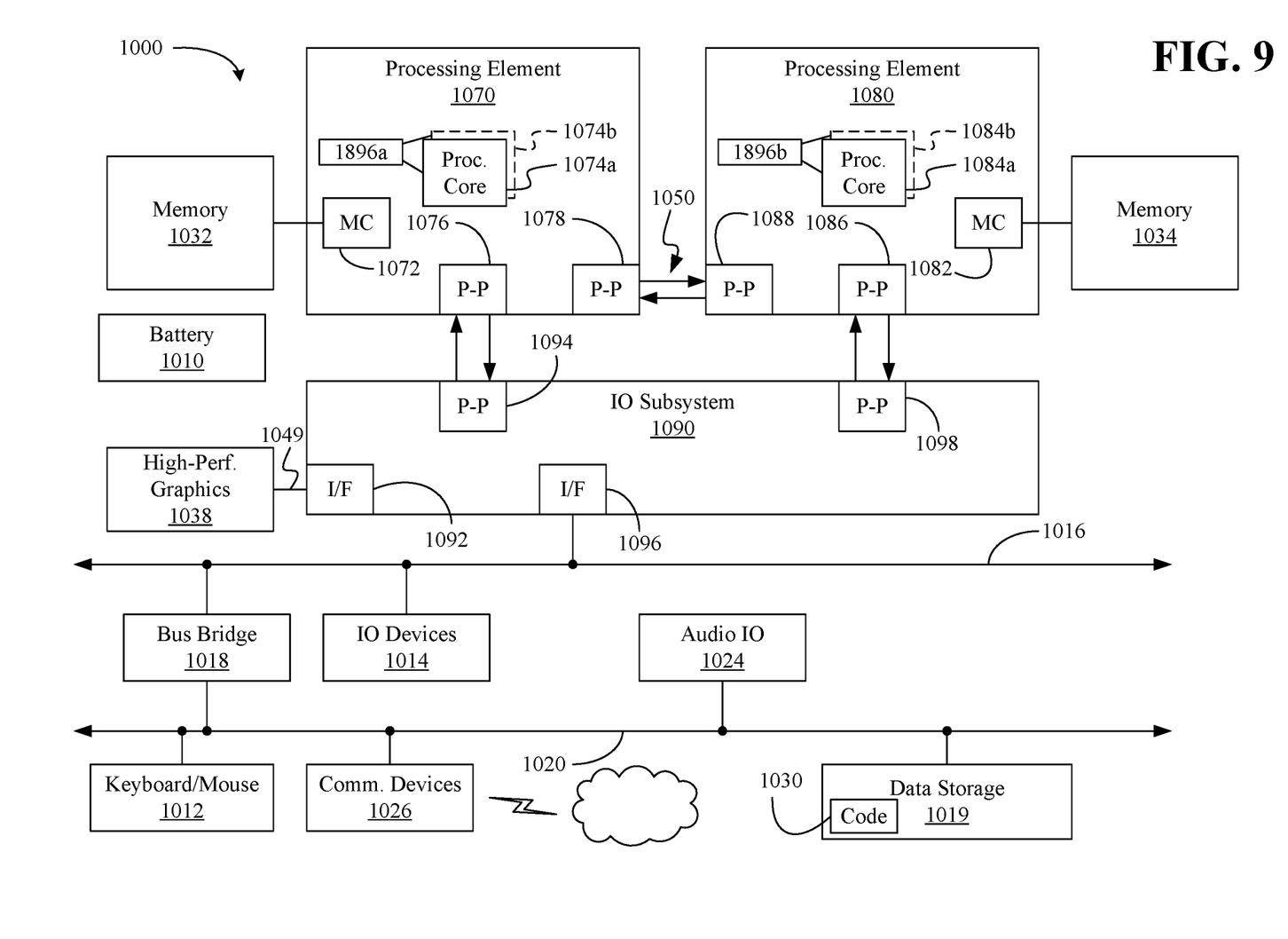
FIG. 9 is a block diagram of an example of a multi-processor based computing system according to an embodiment.

Referring now to FIG. 9, shown is a block diagram of a computing system 1000 embodiment in accordance with an embodiment. Shown in FIG. 9 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, where the first processing element 1070 and the second processing element 1080 are coupled via a point-to-point interconnect 1050. It should be understood that any or all of the interconnects illustrated in FIG. 9 may be implemented as a multi-drop bus rather than point-to-point interconnect.

As shown in FIG. 9, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 8.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 9, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 9, the I/O subsystem 1090 includes P-P interfaces 1094 and 1098. Furthermore, I/O subsystem 1090 includes an interface 1092 to couple 1/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 9, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 80 (FIG. 4) and/or the method 90 (FIG. 5), already discussed, and may be similar to the code 213 (FIG. 8), already discussed. Further, an audio I/O 1024 may be coupled to second bus 1020 and a battery 1010 may supply power to the computing system 1000.

Note that other embodiments are contemplated. For example, instead of the point-to-point architecture of FIG. 9, a system may implement a multi-drop bus or another such communication topology. Also, the elements of FIG. 9 may alternatively be partitioned using more or fewer integrated chips than shown in FIG. 9.

Additional Notes and Examples

Example 1 may include a computer system comprising a processor, and a memory coupled to the processor, the memory including executable computer program instructions, which when executed by the processor, cause the system to train a neural network comprising at least a first network layer and a second network layer, wherein the second network layer is coupled to an output of the first network layer, and wherein the first network layer has a plurality of channels, aggregate context information from the first network layer of the neural network, wherein the context information is to be aggregated in real-time and after a training of the neural network, and wherein the context information is to include channel values, generate a feature vector associated with the first network layer of the neural network based on the aggregated context information, generate an importance score vector based on the generated feature vector, wherein the importance score vector includes information indicating importance of corresponding channels of the first network layer, and selectively exclude one or more channels in the first network layer from consideration by the second network layer based on the importance score vector.

Example 2 may include the system of Example 1, wherein the instructions, when executed, cause the system to average the channel values to aggregate the context information from the first network layer of the neural network.

Example 3 may include the system of Example 1, wherein the importance score vector has zero values for neurons in less important channels of the first network layer.

Example 4 may include the system of Example 3, wherein the instructions, when executed, further cause the system to multiply the output of the first network layer by the importance score vector.

Example 5 may include the system of Example 1, wherein the instructions, when executed, cause the system to select the one or more channels of the first network layer based on a pruning ratio constraint, wherein the pruning ratio constraint is a percentage of channels to be pruned.

Example 6 may include the system of Example 1, wherein the instructions, when executed, cause the computing system to determine a layer width loss of the first network layer based on a pruning ratio constraint, wherein the pruning ratio constraint is a percentage of channels to be pruned, and balance, during the training of the neural network, an accuracy constraint of the first network layer against the layer width loss.

Example 7 may include an apparatus comprising logic coupled to one or more substrates, wherein the logic is implemented at least partly in one or more of configurable logic or fixed-functionality hardware logic, the logic coupled to the one or more substrates to aggregate context information from a first network layer in a neural network having a second network layer coupled to an output of the first network layer, wherein the context information is to be aggregated in real-time and after a training of the neural network, and wherein the context information is to include channel values, conduct an importance classification of the aggregated context information, and selectively exclude one or more channels in the first network layer from consideration by the second network layer based on the importance classification.

Example 8 may include the apparatus of Example 7, wherein the logic coupled to the one or more substrates is to generate, by a first fully connected layer in a branch path located between the first network layer and the second network layer, a high-level feature vector associated with the first network layer based on the aggregated context information, and generate, by a second fully connected layer in the branch path, an importance score vector based on the high-level feature vector.

Example 9 may include the apparatus of Example 8, wherein the importance score vector is to contain zero values for neurons in less important channels, and wherein instructions to selectively exclude the one or more channels, when executed, cause the computing system to multiply the output of the first network layer by the importance score vector.

Example 10 may include the apparatus of Example 7, wherein the logic coupled to the one or more substrates is to select the one or more channels based on a pruning ratio constraint, wherein the pruning ratio constraint is a percentage of channels to be pruned.

Example 11 may include the apparatus of Example 7, wherein the logic coupled to the one or more substrates is to determine a layer width loss of the first network layer based on a pruning ratio constraint, wherein the pruning ratio constraint is a percentage of channels to be pruned, and balance, during the training of the neural network, an accuracy constraint of the first network layer against the layer width loss.

Example 12 may include the apparatus of Example 7, wherein the logic coupled to the one or more substrates is to average, by a downsample layer in a branch path located between the first network layer and the second network layer, channel values in the first network layer.

Example 13 may include the apparatus of any one of Examples 7 to 12, wherein the logic coupled to the one or more substrates is to prune the neural network during the training of the neural network.

Example 14 may include the apparatus of any one of Examples 7 to 12, wherein the logic coupled to the one or more substrates includes transistor channel regions that are positioned within the one or more substrates.

Example 15 may include a computer method of dynamically pruning neurons of a neural network, comprising aggregating context information from a first network layer in the neural network, wherein a second network layer of the neural network is coupled to an output of the first network layer, wherein the context information is aggregated in real-time and after a training of the neural network, and wherein the context information includes channel values, conducting an importance classification of the aggregated context information, and selectively excluding one or more channels in the first network layer from consideration by the second network layer based on the importance classification.

Example 16 may include the method of Example 15, wherein conducting the importance classification includes generating, by a first fully connected layer in a branch path located between the first network layer and the second network layer, a high-level feature vector associated with the first network layer based on the aggregated context information, and generating, by a second fully connected layer in the branch path, an importance score vector based on the high-level feature vector.

Example 17 may include the method of Example 16, wherein the importance score vector contains zero values for neurons in less important channels, and wherein selectively excluding the one or more channels in the first network layer from consideration by the second network layer includes multiplying the output of the first network layer by the importance score vector.

Example 18 may include the method of Example 15, further including selecting the one or more channels based on a pruning ratio constraint.

Example 19 may include at least one non-transitory computer readable storage medium comprising executable computer program instructions, which when executed by a computing system, cause the computing system to aggregate context information from a first network layer in a neural network having a second network layer coupled to an output of the first network layer, wherein the context information is to be aggregated in real-time and after a training of the neural network, and wherein the context information is to include channel values, conduct an importance classification of the aggregated context information, and selectively exclude one or more channels in the first network layer from consideration by the second network layer based on the importance classification.

Example 20 may include the at least one non-transitory computer readable storage medium of Example 19, wherein instructions to conduct the importance classification, when executed, cause the computing system to generate, by a first fully connected layer in a branch path located between the first network layer and the second network layer, a high-level feature vector associated with the first network layer based on the aggregated context information, and generate, by a second fully connected layer in the branch path, an importance score vector based on the high-level feature vector.

Example 21 may include the at least one non-transitory computer readable storage medium of Example 20, wherein the importance score vector is to contain zero values for neurons in less important channels, and wherein instructions to selectively exclude the one or more channels, when executed, cause the computing system to multiply the output of the first network layer by the importance score vector.

Example 22 may include the at least one non-transitory computer readable storage medium of Example 19, wherein the instructions, when executed, cause the computing system to select the one or more channels based on a pruning ratio constraint, wherein the pruning ratio constraint is a percentage of channels to be pruned.

Example 23 may include the at least one non-transitory computer readable storage medium of Example 19, wherein the instructions, when executed, cause the computing system to determine a layer width loss of the first network layer based on a pruning ratio constraint, wherein the pruning ratio constraint is a percentage of channels to be pruned, and balance, during the training of the neural network, an accuracy constraint of the first network layer against the layer width loss.

Example 24 may include the at least one non-transitory computer readable storage medium of Example 19, wherein instructions to aggregate the context information, when executed, cause the computing system to average, by a downsample layer in a branch path located between the first network layer and the second network layer, channel values in the first network layer.

Example 25 may include the at least one non-transitory computer readable storage medium of any one of Examples 19 to 24, wherein the instructions, when executed, cause the computing system to prune the neural network during the training of the neural network.

Thus, building block technology described herein may create lighter neural networks that solve computer vision and/or natural language processing problems in real-time on embedded processors. The technology may be used for hardware evaluation and design. Moreover, the execution time of particular network layers may be reduced considerably (e.g., 33% or more). The technology is also advantageous over knowledge distillation solutions that transfer knowledge from a large network to a smaller one, but fail to address redundancy or dynamic channel importance. Similarly, the technology is beneficial over quantization-based approaches that merely use fixed-point arithmetic to speed up CNN inference time without any solution for redundancy reduction or dynamic channel pruning. The technology may also be easily integrated into various types of CNN architectures, which makes it promising in numerous applications, with or without specialized deep learning accelerators.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms.
Therefore, while the embodiments have been described in connection with particular examples thereof, the true scope of the embodiments should not be so limited since other modifications will become apparent to the skilled practitioner upon a study of the drawings, specification, and following claims.

We claim:

1. A computer system comprising:
  a processor; and
  a memory coupled to the processor, the memory including executable computer program instructions, which when executed by the processor, cause the system to:
   train a neural network comprising at least a first network layer and a second network layer, wherein the second network layer is coupled to an output of the first network layer, and wherein the first network layer has a plurality of channels;
   aggregate context information from the first network layer of the neural network, wherein the context information is to be aggregated in real-time and after a training of the neural network, and wherein the context information is to include channel values;
   generate a feature vector associated with the first network layer of the neural network based on the aggregated context information;
   generate an importance score vector based on the generated feature vector, wherein the importance score vector includes information indicating importance of corresponding channels of the first network layer; and
   selectively, during an inference process when the neural network is deployed, exclude one or more channels in the first network layer from consideration by the second network layer based on the importance score vector, wherein instructions to selectively exclude the one or more channels, when executed, cause the computer system to multiply the output of the first network layer by the importance score vector.

2. The system of claim 1, wherein the instructions, when executed, cause the system to average the channel values to aggregate the context information from the first network layer of the neural network.

3. The system of claim 1, wherein the importance score vector has zero values for neurons in less important channels of the first network layer.

4. The system of claim 1, wherein the instructions, when executed, cause the system to select the one or more channels of the first network layer based on a pruning ratio constraint, wherein the pruning ratio constraint is a percentage of channels to be pruned.

5. The system of claim 1, wherein the instructions, when executed, cause the computing system to:
  determine a layer width loss of the first network layer based on a pruning ratio constraint, wherein the pruning ratio constraint is a percentage of channels to be pruned; and
  balance, during the training of the neural network, an accuracy constraint of the first network layer against the layer width loss.

6. An apparatus comprising:
  logic coupled to one or more substrates, wherein the logic is implemented at least partly in one or more of configurable logic or fixed-functionality hardware logic, the logic coupled to the one or more substrates to:
   aggregate context information from a first network layer in a neural network having a second network layer coupled to an output of the first network layer, wherein the context information is to be aggregated in real-time and after a training of the neural network, and wherein the context information is to include channel values,
   conduct an importance classification of the aggregated context information, and
   selectively exclude, during an inference process when the neural network is deployed, one or more channels in the first network layer from consideration by the second network layer based on an importance score vector associated with the importance classification, wherein instructions to selectively exclude the one or more channels, when executed, cause the apparatus to multiply the output of the first network layer by the importance score vector.

7. The apparatus of claim 6, wherein the logic coupled to the one or more substrates is to:
  generate, by a first fully connected layer in a branch path located between the first network layer and the second network layer, a high-level feature vector associated with the first network layer based on the aggregated context information; and
  generate, by a second fully connected layer in the branch path, the importance score vector based on the high-level feature vector.

8. The apparatus of claim 7, wherein the importance score vector is to contain zero values for neurons in less important channels.

9. The apparatus of claim 6, wherein the logic coupled to the one or more substrates is to select the one or more channels based on a pruning ratio constraint, wherein the pruning ratio constraint is a percentage of channels to be pruned.

10. The apparatus of claim 6, wherein the logic coupled to the one or more substrates is to:
  determine a layer width loss of the first network layer based on a pruning ratio constraint, wherein the pruning ratio constraint is a percentage of channels to be pruned; and
  balance, during the training of the neural network, an accuracy constraint of the first network layer against the layer width loss.

11. The apparatus of claim 6, wherein the logic coupled to the one or more substrates is to average, by a downsample layer in a branch path located between the first network layer and the second network layer, channel values in the first network layer.

12. The apparatus of claim 6, wherein the logic coupled to the one or more substrates is to prune the neural network during the training of the neural network.

13. The apparatus of claim 6, wherein the logic coupled to the one or more substrates includes transistor channel regions that are positioned within the one or more substrates.

14. A computer method of dynamically pruning neurons of a neural network, comprising:
   aggregating context information from a first network layer in the neural network, wherein a second network layer of the neural network is coupled to an output of the first network layer, wherein the context information is aggregated in real-time and after a training of the neural network, and wherein the context information includes channel values;
   conducting an importance classification of the aggregated context information; and
   selectively excluding, during an inference process when the neural network is deployed, one or more channels in the first network layer from consideration by the second network layer based on an importance score vector associated with the importance classification, wherein the selectively excluding the one or more channels in the first network layer from consideration by the second network layer includes multiplying the output of the first network layer by the importance score vector.

15. The method of claim 14, wherein conducting the importance classification includes:
   generating, by a first fully connected layer in a branch path located between the first network layer and the second network layer, a high-level feature vector associated with the first network layer based on the aggregated context information; and
   generating, by a second fully connected layer in the branch path, an importance score vector based on the high-level feature vector.

16. The method of claim 15, wherein the importance score vector contains zero values for neurons in less important channels.

17. The method of claim 14, further including selecting the one or more channels based on a pruning ratio constraint.

18. At least one non-transitory computer readable storage medium comprising executable computer program instructions, which when executed by a computing system, cause the computing system to:
   aggregate context information from a first network layer in a neural network having a second network layer coupled to an output of the first network layer, wherein the context information is to be aggregated in real-time and after a training of the neural network, and wherein the context information is to include channel values;
   conduct an importance classification of the aggregated context information; and
   selectively exclude, during an inference process when the neural network is deployed, one or more channels in the first network layer from consideration by the second network layer based on an importance score vector associated with the importance classification, wherein instructions to selectively exclude the one or more channels, when executed, cause the computing system to multiply the output of the first network layer by the importance score vector.

19. The at least one non-transitory computer readable storage medium of claim 18, wherein instructions to conduct the importance classification, when executed, cause the computing system to:
   generate, by a first fully connected layer in a branch path located between the first network layer and the second network layer, a high-level feature vector associated with the first network layer based on the aggregated context information; and
   generate, by a second fully connected layer in the branch path, the importance score vector based on the high-level feature vector.

20. The at least one non-transitory computer readable storage medium of claim 19, wherein the importance score vector is to contain zero values for neurons in less important channels.

21. The at least one non-transitory computer readable storage medium of claim 18, wherein the instructions, when executed, cause the computing system to select the one or more channels based on a pruning ratio constraint, wherein the pruning ratio constraint is a percentage of channels to be pruned.

22. The at least one non-transitory computer readable storage medium of claim 18, wherein the instructions, when executed, cause the computing system to:
   determine a layer width loss of the first network layer based on a pruning ratio constraint, wherein the pruning ratio constraint is a percentage of channels to be pruned; and
   balance, during the training of the neural network, an accuracy constraint of the first network layer against the layer width loss.

23. The at least one non-transitory computer readable storage medium of claim 18, wherein instructions to aggregate the context information, when executed, cause the computing system to average, by a downsample layer in a branch path located between the first network layer and the second network layer, channel values in the first network layer.

24. The at least one non-transitory computer readable storage medium of claim 18, wherein the instructions, when executed, cause the computing system to prune the neural network during the training of the neural network.

* * * * *